UNITED STATES PATENT OFFICE.

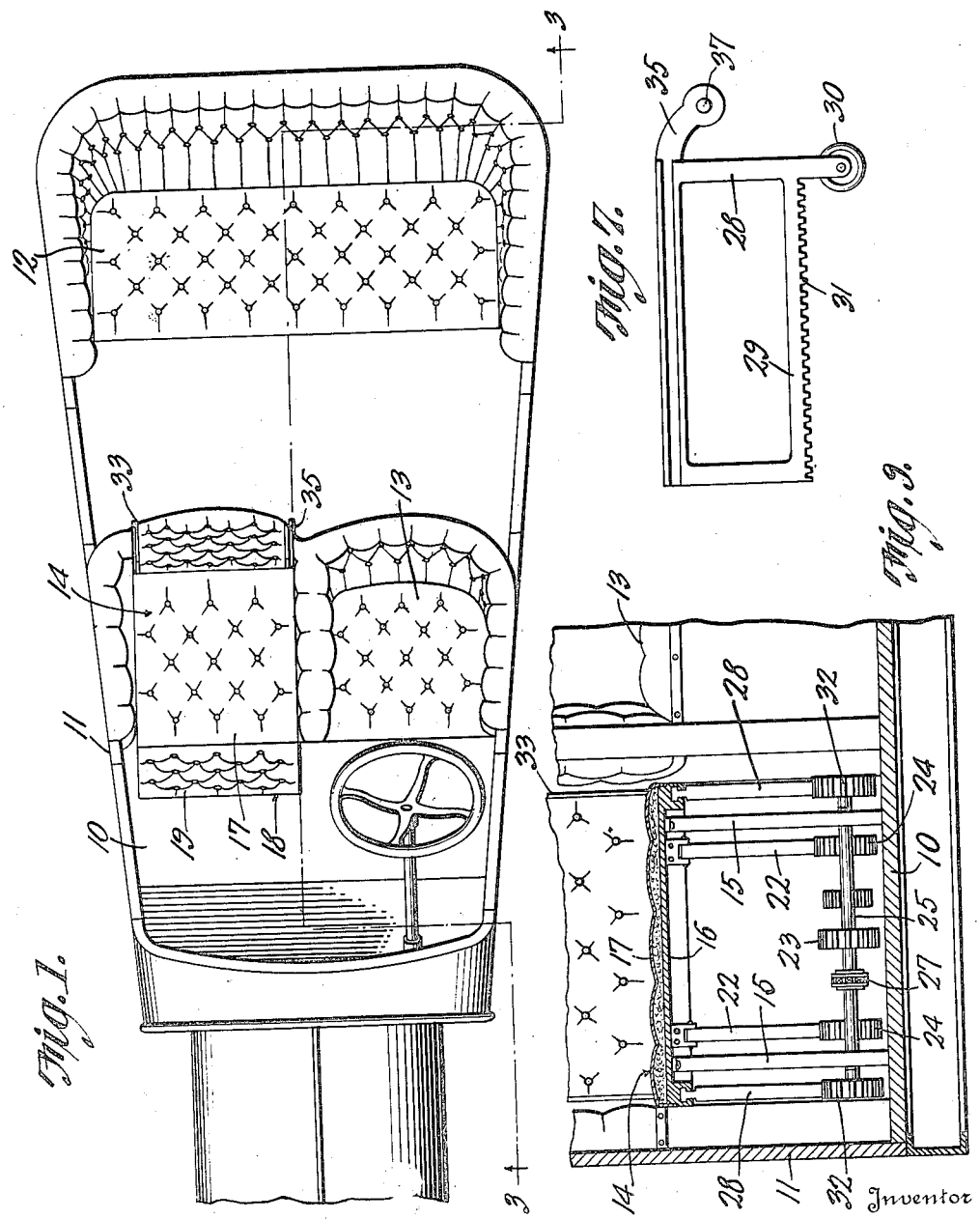

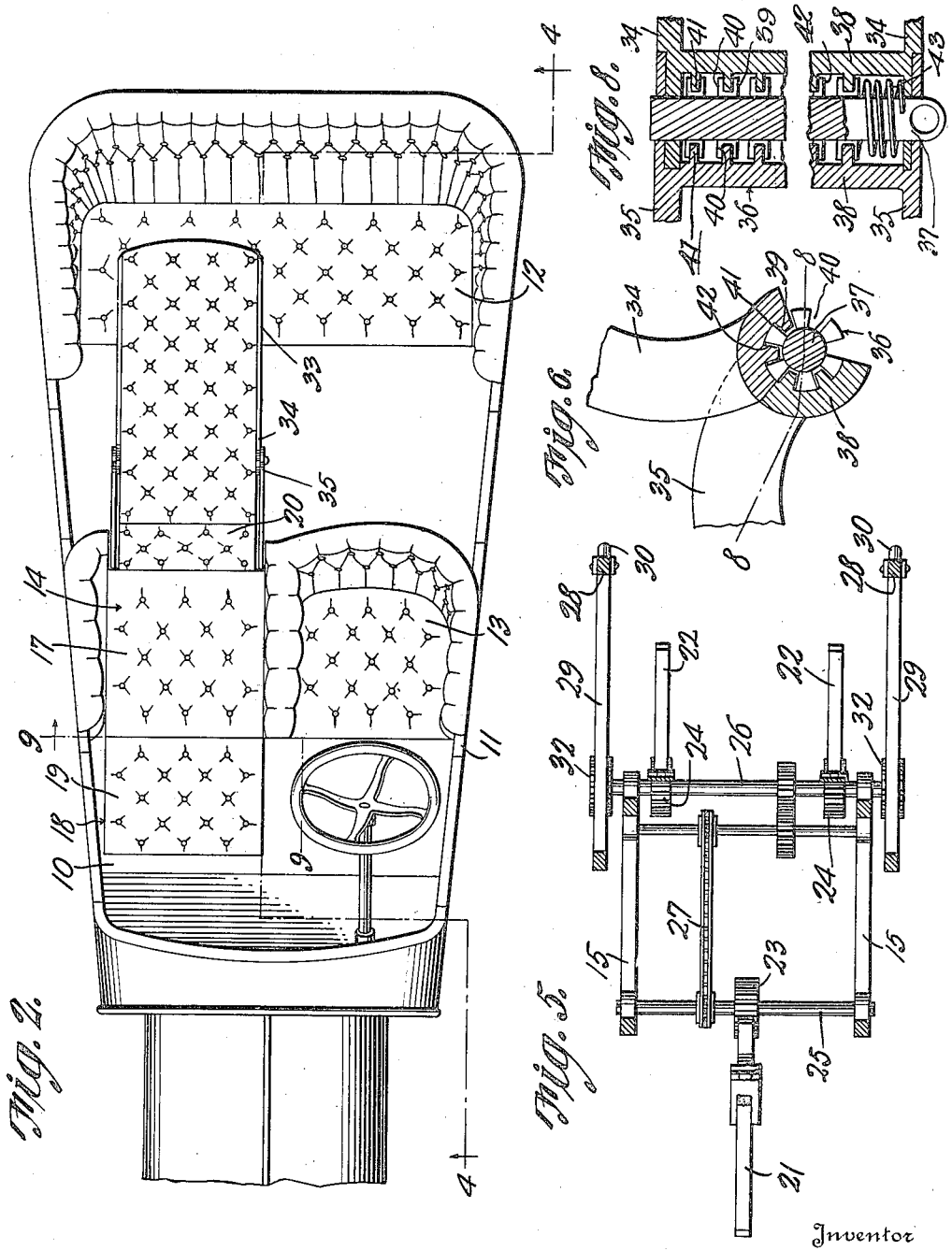

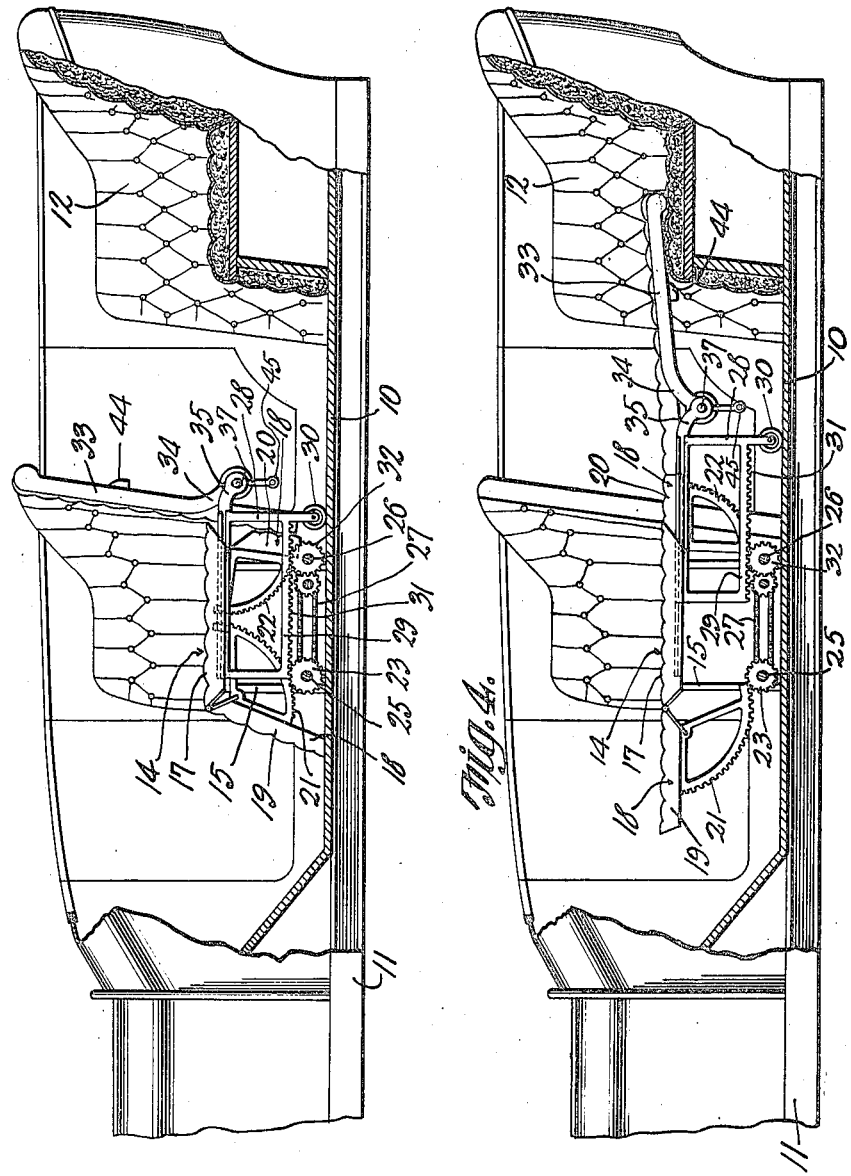

MICHAEL D. MURRAY, OF AMBRIDGE, PENNSYLVANIA.

AUTOMOBILE-COUCH.

1,241,420. Specification of Letters Patent. Patented Sept. 25, 1917.

Application filed February 16, 1916. Serial No. 78,651.

*To all whom it may concern:*

Be it known that I, MICHAEL D. MURRAY, a citizen of the United States, residing at Ambridge, in the county of Beaver and State of Pennsylvania, have invented certain new and useful Improvements in Automobile-Couches, of which the following is a specification.

The present invention relates to improvements in automobile couches, one object of the invention being the provision of a novel arrangement of front seat, whereby the same may be readily converted into a reclining seat and also a couch.

A further object of the present invention is the provision of a seat mechanism alongside of the chauffeur's seat, whereby the same when pulled upon will automatically extend the seat portion and incline the back so that a reclining seat or couch may be had when desired.

A still further object of this invention is the provision of a novel mounting for the various members that constitute the seat portion and back portion, that will permit of the seat portion being collapsed when the back is up, and which will permit such portion to be extended when the back is down.

In the accompanying drawings:—

Figure 1 is a top plan view of an automobile body made according to and embodying my invention.

Fig. 2 is a similar view with the seat in the position it assumes when forming a couch.

Fig. 3 is a section taken on line 3—3 of Fig. 1.

Fig. 4 is a section on line 4—4 of Fig. 2.

Fig. 5 is a top plan view of the couch seat extended with the cushions removed to show the mechanism.

Fig. 6 is a view on an enlarged scale showing the hinging connection of the back.

Fig. 7 is an enlarged view of the back carrying and seat extension operator.

Fig. 8 is an enlarged detail view of the hinging connection of the back taken on line 8—8 of Fig. 6.

Fig. 9 is a section on line 9—9 of Fig. 2.

Referring to the drawings, the numeral 10 designates the bottom of the body 11, which carries the usual rear seat 12 and the chauffeur's seat 13. The couch seat 14, although here shown at the right hand side of the body may be disposed at the left, as may be desired.

This couch seat 14 consists of the frame 15, which carries the stationary section 16, for the reception of the cushion 17, while mounted at the front and rear edges of the section 16 are the two sets of hinging elements 18, to which are connected the oppositely movable cushion carrying sections 19 and 20.

Connected to the front section 19 is an operating segment 21, while connected to the rear section 20 are two operating segments 22. Each of these segments is provided with a toothed portion, which mesh with the respective gears 23 and 24, mounted upon the respective parallel shafts 25 and 26 journaled in the base of the frame 15, and operably connected by the sprockets and chains 27 for simultaneous movement. Thus by rotating both shafts 25 and 26, both sets of segments are operated to extend or collapse the seat sections 19 and 20.

A slidable frame 28 is mounted in the frame 15 and is adapted to assume the positions as shown in Figs. 3 and 4, being pulled out or toward the rear seat to extend the sections, and pushed into to collapse them. This frame consists of the two side members 29, slidably mounted in the underside of the section 16, and the casters 30, which slide upon the bottom of the body. The lower edges of the members 29 are provided with gear teeth 31 which mesh with the gears 32 fast upon the shaft 26, thereby making an operative connection between the sliding frame and the shafts 25 and 26, so that as the frame is moved to and fro sections 19 and 20 are moved from a horizontal plane to parallel positions.

The back frame 33, has one of its ends 34 connected to one of the rearwardly and downwardly curved arms or members 35, carried by the sliding frame 28, the other end of the back frame being connected to the other curved arm 35 by a novel locking device 36, the same being clearly shown in Figs. 6 and 8.

The locking device in the present instance consists in the provision of semi-cylindrical casing sections 38 formed on the adjacent ends of the end portion 34 and the arm 35, the ends of the casing sections being pivotally engaged by a sliding lock bolt 37 the outer surface of which is provided with a plurality of rows of radially extending lugs 39, the spaces between the rows of lugs constituting annular grooves 40. Coöperating with the lugs 39 and the grooves 40 are spaced circles of inwardly extending lugs 41 said lugs being formed integral with the inner periphery of the casing sections 38 while the spaces between the circles of lugs constitute annular grooves 42. A coil spring 43 normally serves to maintain the lugs 39 in locked engagement with the lugs 41 so as to consequently maintain the back section in a substantially rigid position with respect to the sliding frame; however, it is to be appreciated that by pulling the bolt 37 against the tension of the spring 43 the lugs 39 will be alined with the grooves 42 and likewise the grooves 40 alined with the lugs 41 said arrangement permitting of the pivotal movement of the back section and consequently an adjustment of this back section to a predetermined position. Upon release of the bolt 37 the spring automatically returns the lugs and grooves into locked engagement with each other.

Disposed upon the rear of the back frame is a hand grip 44 by means of which the same may be operated, while connected to the lower portion thereof is a foot rest 45.

From the foregoing description taken in connection with the drawings, it is evident that with a seat constructed according to this invention, that the same may be operated to assume a seat with a straight or reclining back, and may be extended to form a couch with the back section resting upon the rear seat.

What I claim, as new, is:—

1. A couch seat, comprising a frame, a stationary seat section carried thereby, two movable extension seat sections carried thereby, a tooth segment connected to each extension seat section, two shafts journaled in the frame and mounted for simultaneous movement, gears mounted upon the shafts and operably connected to the segments, and means for operating the shafts to extend or collapse the extension seat sections.

2. A couch seat, comprising a frame, a stationary section carried thereby, two extension seat sections hingedly connected thereto, a slidable frame mounted within the frame, and mechanism interposed between the slidable frame and the extension seat sections, whereby as the slidable frame is moved the extension seat sections are moved simultaneously.

3. A couch seat, comprising a stationary frame, a slidable frame mounted therein, two hinged seat sections, a stationary seat section carried by the stationary frame and intermediate of the two hinged seat sections, two shafts journaled in the stationary frame, and means connecting the shafts together and to the two extension seat sections and the slidable frame, whereby as the frame is slid the extension seat sections are extended or collapsed.

4. A couch seat, comprising a stationary frame, a fixed seat section carried thereby, two hinged extension seat sections connected to the stationary frame for coöperation with the fixed section, a sliding frame mounted in the stationary frame, two shafts operably connected together and journaled in the stationary frame, means operably connecting each extension seat section to its shaft, and means connecting the sliding frame to one of the shafts, whereby as the sliding frame is operated the extension seat sections are simultaneously moved.

5. A couch seat including a main frame, a stationary seat section carried thereby, movable sections pivoted to the front and rear edges of the stationary seat section, actuating means mounted in the frame for extending the movable sections, a sliding frame mounted in the main frame for operating the actuating means so as to extend the movable sections simultaneously with outward movement of the sliding frame, and another section serving as a back for the stationary seat section pivotally and adjustably connected to the sliding frame.

6. A couch seat including a main frame, a stationary seat section carried thereby, movable sections pivoted to the front and rear edges of the stationary seat section, actuating means mounted in the main frame and connected to the movable sections for extending the movable sections, a sliding frame mounted in the main frame and operatively connected to the actuating means so as to extend and operate the actuating means simultaneously with the outward movement of the sliding frame, a back section, and coöperative pivoting and locking means for maintaining the back section in various positions of adjustment with respect to the sliding frame.

7. The combination with a motor car body having a rear seat and a chauffeur's seat of a couch seat disposed adjacent one side of the chauffeur's seat and comprising a stationary frame, a stationary seat section mounted on the frame, extension sections pivoted to the front and rear edges of the stationary seat section, means for extending the extension sections, a sliding frame mounted in the main frame and arranged to actuate the operating means when moved outwardly, a back section connected to the outer end of the sliding frame, and means for securing the back section in either a vertical or horizontal position.

In testimony whereof I affix my signature.

MICHAEL D. MURRAY.